(12) United States Patent
Tonn (10) Patent No.: US 9,863,842 B2
(45) Date of Patent: Jan. 9, 2018

(54) METHOD FOR CHARACTERIZING AN OPHTHALMIC LENS

(71) Applicant: Novartis AG, Basel (CH)

(72) Inventor: Thomas Tonn, Aschaffenburg (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 15/245,270

(22) Filed: Aug. 24, 2016

(65) Prior Publication Data

US 2017/0089802 A1    Mar. 30, 2017

Related U.S. Application Data

(60) Provisional application No. 62/222,885, filed on Sep. 24, 2015.

(51) Int. Cl.
*G01B 9/00* (2006.01)
*G01M 11/02* (2006.01)
*G01M 11/08* (2006.01)
*G02B 26/02* (2006.01)
*G02C 7/04* (2006.01)

(52) U.S. Cl.
CPC ........ *G01M 11/0285* (2013.01); *G01M 11/08* (2013.01); *G02B 26/023* (2013.01); *G02C 7/04* (2013.01)

(58) Field of Classification Search
CPC . G01M 11/0285; G01M 11/08; G02B 26/023; G02C 7/04

USPC ................................................. 356/124–137
See application file for complete search history.

(56) References Cited

U.S. PATENT DOCUMENTS

| 2012/0133957 A1 | 5/2012 | Widman |
| 2012/0206710 A1 | 8/2012 | Niemelä |
| 2014/0092395 A1 | 4/2014 | Fechner |
| 2014/0368812 A1 | 12/2014 | Humphry |

FOREIGN PATENT DOCUMENTS

| EP | 0232986 A1 | 8/1987 |
| GB | 2069172 A  | 8/1981 |

OTHER PUBLICATIONS

José M. González-Méijome et al, "Equivalences between refractive index and equilibrium water content of conventional and silicone hydrogel soft contact lenses from automated and manual refractometry", Journal of Biomedical Materials Research Part B: Applied Biomaterials, (Jan. 1, 2007), vol. 80B, No. 1, pp. 184-191.

*Primary Examiner* — Tri T Ton
(74) *Attorney, Agent, or Firm* — Sheng-Hsin Hu (57) ABSTRACT

Contact lenses often comprise a coating containing water so as to enhance comfort when being worn on the eye. The present invention is useful to determine the water content of the coating of a contact lens. To determine the water content of the coating, the lens having the coating to be measured is arranged under water. The reflectivity of the surface of the lens is then determined with the aid of a Chromatic sensor system.

18 Claims, 2 Drawing Sheets

METHOD FOR CHARACTERIZING AN OPHTHALMIC LENS

This application claims the benefit under 35 U.S.C. §119 (e) of U.S. provisional Application No. 62/222,885 filed Sep. 24, 2015, the content of which are incorporated by reference in its entirety.

FIELD OF THE INVENTION

The invention relates to a method for characterizing an ophthalmic lens, in particular a contact lens.

BACKGROUND

In order to improve the tolerance and the comfort of ophthalmic lenses, in particular contact lenses, considerable effort is undertaken. Aspects of interest in this respect are the wettability of an ophthalmic lens with lacrimal fluid, the resistance to proteinaceous deposits, biocompatibility, etc. Generally, for the manufacture of ophthalmic lenses specific lens materials are used which are highly hygroscopic and have a high wettability. Ophthalmic lenses also may be plasma treated, e.g. by exposing them to an oxygen plasma, in order to modify the lens surfaces and to improve the wettability thereof and to increase the resistance of the surface against contaminations. In another approach ophthalmic lenses may be provided with a coating in order to obtain the desired lens properties.

Providing an ophthalmic lens substrate, in particular a contact lens substrate, of one material with a coating of a different material has been proposed as a strategy for making contact lenses for a variety of reasons. The coating may offer properties that are different from those of the lens substrate and which are particularly desirable at a lens surface apart from the properties of the lens substrate material itself. Properties such as wettability, resistance to proteinaceous deposits, biocompatibility, UV shielding and other desirable lens characteristics and properties may conceivably be addressed by a specific coating. However, there may appear problems associated with coating lens substrates which include repeatability of both polymer type and coating thickness. Therefore, coated ophthalmic lenses, in particular contact lenses, are routinely inspected for the quality of the coating. Such inspection is also carried out e.g. when new coating materials are tested or in order to determine which coating thickness is necessary to achieve the desired properties, in particular with regard to wettability, resistance to proteinaceous deposits, aging, mechanical endurance etc. For example rubbing tests are performed manually, the results of which are very subjective and inaccurate. Such tribological methods applied by an experienced test person can only provide some qualitative results, which may somewhat be indirectly representative of the material properties of the coating and which may be highly subjective.

The wettability or hydrophilic properties of an ophthalmic lens with or without coating may e.g. be determined by measuring the contact angle in between the inspected surface of the lens substrate and a wetting liquid, usually water or a lacrimal fluid. A small measured contact angle indicates a good wettability and a good resistance to proteinaceous deposits. The measurement of the contact angle, however, is a rather cumbersome and inaccurate method for a determination of the quality of a surface of an ophthalmic lens. In particular with coated lenses the method is rather insensitive to changes of the coating, such as e.g. coating time, coating thickness, hydrophilicity, etc. Therefore, there exists a strong desire for a more convenient measurement method, which provides more accuracy and has a broader field of application with regard to the inspection and classification of the quality of a surface of an ophthalmic lens, which may be provided with a coating.

SUMMARY OF THE INVENTION

In the following, whenever features are combined with the term "or", the term "or" is to be understood to also include "and" unless it is evident from the specification that the term "or" must be understood as being exclusive. For example, the term "determining a transition from the fluid to the front surface or the back surface of the ophthalmic lens" is to be understood to include cases in which only the transition to the front surface is determined, furthermore to include cases in which only the transition to the back surface is determined, as well as cases in which both the transition to the front surface and to the back surface is determined.

The present invention suggests a method for characterizing an ophthalmic lens, in particular a contact lens, having a front surface and a back surface, which method comprises the steps of:
 immersing the ophthalmic lens in a fluid selected from the group consisting of water, lacrimal fluid, tear-like fluid, and mixtures thereof, and
with the aid of a chromatic sensor system:
 determining a transition from the fluid to the front surface or to the back surface of the ophthalmic lens to identify the location of the front surface or back surface of the ophthalmic lens,
  by illuminating at least one segment of the front surface or the back surface of the ophthalmic lens with incident white light;
  directing light reflected from the at least one segment of the front surface or of the back surface of the ophthalmic lens to a spectrometer;
  determining a dominant wavelength of the reflected light, which corresponds to the transition from the fluid to the at least one segment of the front surface or the back surface of the ophthalmic lens;
 at the determined dominant wavelength of the reflected light measuring a reflectivity value of the least one segment of the front surface or the back surface of the ophthalmic lens;
 optionally repeating the afore-mentioned procedure for further segments on the front surface or the back surface of the ophthalmic lens for measuring reflectivity values of the further segments;
 storing each measured reflectivity value,
 comparing each stored measured reflectivity value with a corresponding reference reflectivity value, in particular with a corresponding reference reflectivity value of a front surface or a back surface of a reference ophthalmic lens having known material properties, and
 from a difference between the respective stored measured reflectivity value of the ophthalmic lens and the corresponding reference reflectivity value determining the quality of the inspected surface of the ophthalmic lens.

In accordance with one aspect of the method according to the invention, at least the reflectivity value of a central segment of the front surface or on the back surface of the ophthalmic lens is measured.

In accordance with a further aspect of the method according to the invention as described in the preceding paragraph, in addition the reflectivity values of a number of peripheral segments of a peripheral region of the front surface or the back surface of the ophthalmic lens are measured. The peripheral region of the front surface or the back surface extends from the central segment an angular distance of up to 60°, preferably up to 40°, as measured from a central normal on the ophthalmic lens.

In accordance with still a further aspect of the method according to the invention the reflectivity values are measured in a plurality of segments arranged over the entire front surface or back surface of the ophthalmic lens.

In accordance with yet another aspect of the method according to the invention, the method comprises the step of arranging the ophthalmic lens on a lens support, wherein the reflectivity values are measured in a plurality of segments of the front surface or of the back surface by tilting the lens support together with the ophthalmic lens arranged thereon by an angle of up to 60° relative to a starting position, in which an optical axis of the incident white light and a central normal on the ophthalmic lens coincide, and by rotating the lens support together with the ophthalmic lens arranged thereon about a rotational axis coinciding with the central normal on the ophthalmic lens up to 360°.

In accordance with a still further aspect of the method according to the invention, at least during determination of the reflectivity values the ophthalmic lens is retained on the lens support by suction force.

In accordance with yet a further aspect of the method according to the invention, for the measurement of the reflectivity value of the at least one segment of the back surface of the ophthalmic lens the ophthalmic lens is inverted.

Yet in accordance with a further aspect of the method according to the invention, the step of determining the reflectivity value of each segment on the front surface or the back surface of the ophthalmic lens comprises modulating the intensity of the incident light to obtain a number of well-defined incident light intensities distinct from one another, at the determined dominant wavelength of the reflected light measuring a relative signal strength of a detector of the spectrometer for each well-defined incident light intensity, and from a derivative of the relative signal strength over the corresponding incident light intensities determining the reflectivity.

In accordance with a still further aspect of the method according to the invention the modulation of the incident white light is accomplished by one of the methods selected from the group consisting of variation of an irradiation intensity of a white light source, placing a series of grey scale filters, preferably arranged on a filter wheel, in the optical path of the incident white light, use of optoelectronic devices in the optical path of the incident white light, and varying an amplification of the signal of the detector of the spectrometer, such as, e.g., by varying a sampling time of the detector.

In accordance with another aspect of the method according to the invention the incident white light is directed onto at least one segment of the front surface or the back surface of the ophthalmic lens after having been passed through a wavelength dispersive optical element selected from the group consisting of wavelength dispersive lenses, diffraction gratings, such as, e.g., Fresnel diffraction gratings, and holographic optical elements.

According to yet another aspect of the method according to invention, from the difference between the stored measured reflectivity value and the corresponding reference reflectivity value a water content of the ophthalmic lens at the front surface or back surface of the ophthalmic lens may be quantified.

In accordance with yet another aspect of the method according to the invention, from the difference between the respective stored measured reflectivity value and the corresponding reference reflectivity value an optimum coating material for a respective substrate material may be identified.

In accordance with still a further aspect of the method according to the invention, from the difference between the respective stored measured reflectivity value and the corresponding reference reflectivity value an optimum coating time may be determined.

According to a further aspect of the method according to the invention, from the difference between the respective stored measured reflectivity value and the corresponding reference reflectivity value an amount of absorption of fluid in a coating of a coated ophthalmic lens may be determined qualitatively or quantitatively.

In accordance with yet another aspect of the method according to the invention in addition to a determination of a dominant wavelength of the reflected light of at least one segment on the front surface or the back surface of the ophthalmic lens a second dominant wavelength of reflected light from a corresponding second segment on the back surface or front surface of the ophthalmic lens, respectively, may be detected, the first segment and the second segment and the source of incident white light being coaxial, and from measured reflectivity values at the two detected dominant wavelengths a vertical thickness of the ophthalmic lens at the at least one segment may be determined.

In accordance with a still further aspect of the method according to the invention from a plurality of reflectivity measurements on the front surface or the back surface of the ophthalmic lens a topography of the respective surface may be computed and may optionally be displayed graphically or visually.

In accordance with still another aspect of the method according to the invention the inspected ophthalmic lens is a coated contact lens, in particular a coated soft contact lens.

Hydrophilic surfaces of ophthalmic lenses absorb water or lacrimal fluid or tear-like fluid. In order to achieve a desired hydrophilicity specific lens materials may be selected, the ophthalmic lens may be exposed to a specific plasma-treatment, e.g. oxygen plasma, or the lens substrate may be coated with a hydrophilic coating, e.g. a hydrophilic polymeric coating. For example, when soft contact lenses are worn on the eye, they do not rest directly on the cornea of the eye, but rather they rest on a thin film of lacrimal fluid between the cornea and the back surface of the soft contact lens. The better the wettability of the contact lens with regard to lacrimal fluid, the better the wearing comfort of the lens will be experienced by the wearer. Wettability of contact lens, such as e.g. a coated soft contact lens, is therefore directly linked to the contact lens' ability to absorb lacrimal fluid which to a large extent consists of water and in addition contains various proteins, enzymes and sodium chloride. By immersing a contact lens, or more generally an ophthalmic lens, in water or lacrimal fluid or tear-like fluid, the front surface and the back surface of the ophthalmic lens may absorb the fluid in accordance with their specific hydrophilic and absorption properties, which e.g. may be improved by exposure of the ophthalmic lens to a plasma-treatment or by providing the lens substrate with a hydrophilic coating.

Using a chromatic sensor system a transition from the fluid to the front surface or to the back surface of the ophthalmic lens may then be detected rather easily using the dispersion of incident white light. By passing the incident white light through a wavelength dispersive optical element, usually a dispersive lens, the different wavelengths are focused at different distances from the lens. The blue fraction of the incident white light is focused closer to the dispersive lens than the red fraction. By analyzing the reflected light with a spectrometer a dominant wavelength may be determined, which corresponds to that wavelength which is focused on the transition from the surrounding fluid to the front surface or back surface of the ophthalmic lens. At the detected dominating wavelength the reflectivity of the front surface or of the back surface of the ophthalmic lens may then be measured. It should be noted that the chromatic sensor system may be calibrated in order to determine the intensity of the reflected light at each wavelength within the illuminating wavelength spectrum. This may be achieved by analyzing the light reflected from the surface of a mirror of known reflectivity, which is placed at the measuring position of the ophthalmic lens and whose distance along an optical axis of the incident light may be varied, with the aid of the spectrometer. For each wavelength, thus a reference intensity value may be obtained, which may then be used to standardize measured reflectivities.

A reflectivity value of an inspected segment of the front surface or of the back surface of the ophthalmic lens will strongly depend on the hydrophilicity of the inspected surface of the ophthalmic lens, which e.g. may be provided with a hydrophilic coating. The more fluid is absorbed within the ophthalmic lens at the front or back surface the more the refractive index of the inspected segment of the front surface or of the back surface of the ophthalmic lens will resemble the refractive index of the surrounding fluid, and the smaller the measured reflectivity values of the immersed ophthalmic lens will be. By immersing the ophthalmic lens in water or lacrimal fluid of tear-like fluid the sensitivity of the chromatic sensor system is increased and allows the detection of even only very small variations of the fluid content of the inspected surface. Thus, the measured reflectivity value is a measure for the fluid content of the inspected surface of the ophthalmic lens. The measured reflectivity value may be stored, for example, for visualization on an output device, such as for example an electronic monitor. The measured reflectivity value of the inspected segment of the front surface or the back surface is compared with a reference reflectivity value of a corresponding segment of a front surface or a back surface of a reference ophthalmic lens having known material properties (or, alternatively, with any other suitable known reference reflectivity value). From the comparison of the measured reflectivity value and the reference reflectivity value an immediate qualitative rating of the inspected surface of an ophthalmic lens can be carried out.

The measurement of the reflectivity value of at least one segment of the front surface or the back surface of the immersed ophthalmic lens may be used e.g. for qualitatively determining the wettability of a contact lens substrate, or the effectivity of a plasma treatment of the surfaces of an ophthalmic lens. The measurement may e.g. be used for comparing plasma treatments of ophthalmic lenses with different plasma parameters. In case of an ophthalmic lens which is provided with a hydrophilic coating the measurement of the reflectivity value of at least one segment of the front surface or the back surface of the immersed lens may be used for qualitatively determining the efficiency of a coating process. It may also be used to qualitatively evaluate the durability of the coating with regard to mechanical stress, or to qualitatively characterize a coated ophthalmic lens with regard to long term stability and ageing of the coating. Tribological methods involving a subjective assessment by a more or less experienced test person may be avoided. The test method according to the invention yields objective measurements. It is reproducible, and may be carried out in a non-destructive manner regarding the inspected ophthalmic lens, which may, e.g. be provided with a coating.

The locating of the transition from the fluid to the inspected front surface or back surface of the immersed ophthalmic lens may be accomplished without any axial movement of the chromatic sensor system relative to the ophthalmic lens. The scanning over an axial distance is solely accomplished by the different focus lengths of the different fractions of the incident white light after passing through the wavelength dispersive optical element. The chromatic sensor system may be employed for a discrete segment-wise measurement of the reflectivity value or for an automated scan of the entire front surface or back surface of the immersed ophthalmic lens, which may be provided with a coating. A cumbersome alignment of the chromatic sensor system relative to the ophthalmic lens can be avoided, even when another segment on the front surface or the back surface of the ophthalmic lens is aimed at. Depending on the distance of the front surface or the back surface of the ophthalmic lens from the wavelength dispersive optical element a different dominant wavelength of the reflected light will be determined, which then may be used for measuring the reflectivity.

For a fast scan and for a characterization of a greater number of ophthalmic lenses it may be sufficient if only a central segment in a central portion of the ophthalmic lens is inspected.

In order for the front surface and the back surface of the immersed ophthalmic lens to be inspected, a lens support may be used which allows free 'optical access' to the front surface and the back surface, respectively, of the ophthalmic lens. Alternatively, the measurement of the reflectivity value of at least one segment on the back surface of an ophthalmic lens may be carried out simply by inverting the ophthalmic lens prior to arranging it on the lens support.

During the determination and measurement of the reflectivity values the ophthalmic lens may be retained on the lens support by suction force.

Measurements in the selected peripheral regions in particular cover the optical zone of the coated ophthalmic lens. By measuring the reflectivity values of the front surface or the back surface also in peripheral regions thereof, it may be ensured that the inspected lens surface is homogeneous. With an increasing number of inspected segments of the front surface or the surface of the ophthalmic lens a more detailed characterization of the ophthalmic lens may be achieved. In case of an ophthalmic lens which is provided with a coated front surface and a coated back surface the presence of the coating and its homogeneity may thus be ensured. Such multi-segment measurements may also be useful in particular for a determination of the resistance to mechanical stress of the coating, for longtime endurance and ageing evaluations.

In a so-called full scan, a plurality of segments arranged over the entire front surface or back surface of the coated ophthalmic lens may be inspected. While such a full scan of an ophthalmic lens, which may be provided with a coating, may require a considerable time, such a full scan may be of particular advantage in the handling of customer complaints, in order to clearly identify any defects which may be present on the front or back surfaces of the ophthalmic lens. While such an objected to ophthalmic lens may be inspected and characterized with scrutiny the fully scanned ophthalmic lens is not impaired by the analysis.

From a plurality of reflectivity measurements or a so-called full scan of the front surface or the back surface of the ophthalmic lens a topography of the respective surface may be computed, which then may optionally be displayed graphically or visually, e.g. on a screen. Such procedure may prove advantageous e.g. in the topographical characterization of aspheric or toric lenses with or without prism ballasting.

If it is required, in addition to a determination of a dominant wavelength of the reflected light of at least one segment on the front surface or the back surface of the ophthalmic lens a second dominant wavelength of reflected light from a corresponding second segment on the back surface or front surface of the ophthalmic lens, respectively, may be detected. In this measurement method the first segment and the second segment and the source of incident white light are coaxially aligned. From the measured reflectivity values at the two detected dominant wavelengths a vertical thickness of the ophthalmic lens at the at least one segment may then be determined. The thickness of the ophthalmic lens may be obtained from the distance of the two detected dominant wavelengths on the wavelength-scale after standardizing, and division through the refractive index of the ophthalmic lens.

For the measurements of the reflectivity value of a segment of the front surface or on the back surface of an ophthalmic lens at a determined dominant wavelength of the reflected light, the intensity of the incident light may be modulated, in order to obtain a number of well-defined incident light intensities, which are distinct from one another. With the aid of a detector of the spectrometer at the determined dominant wavelength of the reflected light, a relative signal strength for each well-defined incident light intensity is measured. From a derivative of the relative signal strength over the corresponding incident light intensities, finally, the reflectivity is determined; the reflectivity corresponding to the slope of a curve representing the relative signal strength over the incident light intensities. It should be noted that the modulation of the incident light has the purpose of enhancing the signal to noise ratio and of a reduction of disturbances.

The modulation of the intensity of the incident white light may be accomplished, e.g. by a variation of the irradiation intensity of a white light source. Alternatively a series of grey scale filters may be placed in the optical path of the incident white light. For example, the grey scale filters may be arranged on a filter wheel. A further alternative for modulation of the intensity of the incident white light may consist of the use of optoelectronic devices in the optical path of the incident white light. Finally even an amplification of the signal of the detector of the spectrometer, such as, e.g., by varying a sampling time of the detector, may be regarded as a (simulated) modulation of the intensity of the incident white light.

The white light may be provided by a broad-banded light source of high Intensity and preferably uniform spectral distribution. Examples for such light sources are halogen lamps, LEDs, Xenon lamps. It should be noted though, that the possible broad-band light sources are not limited to the listed examples.

The wavelength dispersive optical element may be wavelength dispersive lenses, diffraction gratings, such as, e.g., Fresnel diffraction gratings, or holographic optical elements.

The method according to the invention even allows a quantitative determination of the water content of the inspected front surface or back surface of the ophthalmic lens. Such quantitative determination of the water content may be based on the fact that the measured reflectivity value is also proportional to the square of the difference between the refractive index of the surrounding fluid and the refractive index of the ophthalmic lens at the fluid-containing surface of the ophthalmic lens, which e.g. may be a coated surface of a coated ophthalmic lens. In this quantitative determination the refractive index of the fluid-containing coating is defined as the sum of the concentration of fluid in the coating multiplied with the refractive index of the fluid, and the concentration of the coating matrix in the coating multiplied with the refractive index of the coating matrix.

Depending on the compatibility of the coating material and the substrate material of the coated ophthalmic lens, the coating will have more or less endurance with regard to mechanical stress. Even the long term stability or the ageing of the coating of a coated ophthalmic lens may be qualitatively evaluated against a reference coated ophthalmic lens by measuring the reflectivity value of at least one segment of the front surface or the back surface of the coated ophthalmic lens periodically over a longer period of time, and by comparing the measured reflectivity value with the corresponding reference reflectivity value of a reference coated ophthalmic lens. It should be noted though, that such long term observations are not restricted to coated ophthalmic lenses. They may be carried out also to gather information e.g. about the stability and the aging of non-coated ophthalmic lenses or about the long term effectivity of plasma treatments of ophthalmic lenses.

Measuring the reflectivity values of coated surfaces of coated ophthalmic lenses and comparing the measured reflectivity values with respective reference reflectivity values of a coated reference ophthalmic lens may be used to identify optimum parameters for carrying out the coating of the ophthalmic lens. Such parameters include but are not limited to coating time, temperature of a coating bath, concentration of the coating bath, etc. The reflectivity measurements may be carried out rather fast with a high local resolution and non-destructive.

The measurement of a reflectivity value of a front surface or of a back surface of an ophthalmic lens, which may be provided with a coating, may also be used for an evaluation of an absorption rate of lens treatment fluid by the ophthalmic lens. For that purpose first the solubility of the lens treatment fluid in water, lacrimal fluid, tear-like fluid, and mixtures thereof is determined. In a further process step the absorption of water, lacrimal fluid, tear-like fluid, and mixtures thereof in the ophthalmic lens, which may be provided with a coating, may be determined qualitatively and even quantitatively from measurements of reflectivity values of the (coated) front surface or the (coated) back surface of a (coated) ophthalmic lens and from a comparison with reference reflectivity values of a reference (coated) ophthalmic lens having known material properties. From the differences between the measured reflectivity values and the corresponding reference reflectivity values the absorption rate of the fluid may be concluded.

While the method according to the invention may be carried out generally for any kind of ophthalmic lens, it is particularly useful and practical in a qualitative or quantitative characterization of contact lenses such as soft contact lenses.

BRIEF DESCRIPTION OF THE DRAWINGS

Further details and advantages of the invention will become apparent from the following description with reference to the schematic drawings, in which.

DETAILED DESCRIPTION OF EMBODIMENTS

Figure 1:
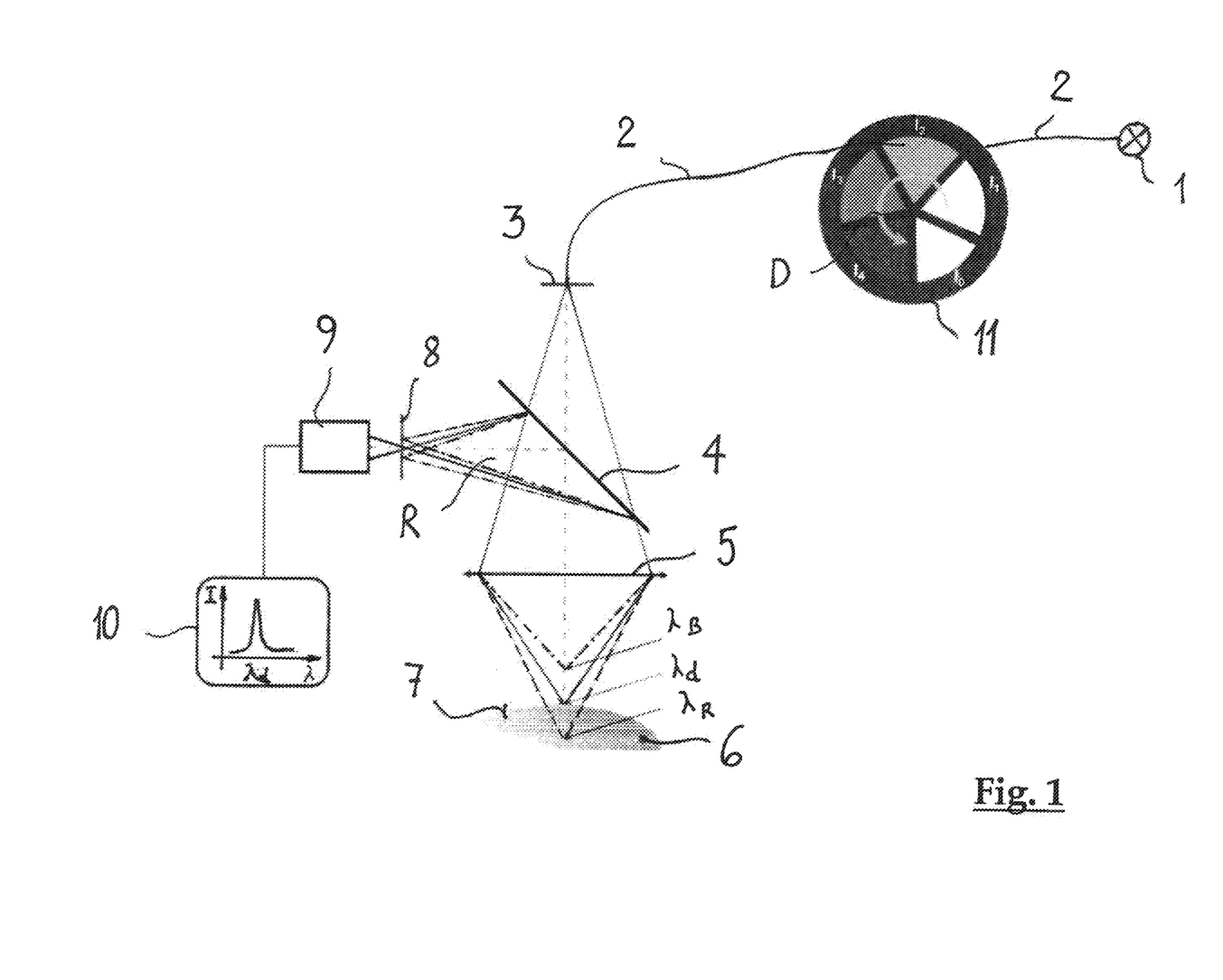
FIG. 1 shows a setup for carrying out the method according to the invention.

The setup which is shown schematically in FIG. 1 comprises a source 1 of white light which is transported e.g. via an optical waveguide 2 to a first pinhole 3. The function of the first pinhole 3 is to reduce the spatial dimension of the incoming white light practically to a point source of white light. From the first pinhole 3, a beam of incident white light L is guided via a beam splitter 4 such as, e.g., a semi-transparent mirror along an optical axis z to a wavelength dispersive optical element 5. The wavelength dispersive optical element may comprise, e.g., wavelength dispersive lenses, diffraction gratings, such as, e.g., Fresnel diffraction gratings, or holographic optical elements. Depending on the wavelength of the incident white light L, the wavelength dispersive optical element 5 focuses the incident white light at different distances from the wavelength dispersive optical element 5. Thus, e.g. blue light $\lambda_B$ is focused at a distance closer to the wavelength dispersive optical element 5, while red light $\lambda_R$ has its focus farther away along an optical axis z.

The thus dispersed incident white light L is directed on a surface 7 of an ophthalmic lens 6, which may, e.g. be a front surface or a back surface of a contact lens, thus irradiating a segment of that surface 7. The ophthalmic lens 6 rests on a support (not shown), and is immersed in a fluid, which may be water or lacrimal fluid or a tear-like fluid or mixtures thereof. In order to be able to irradiate different segments on the surface 7 of the ophthalmic lens 6 the support (not shown) may be tilted together with the ophthalmic lens 6 arranged thereon by an angle of up to 60° relative to a starting position, in which the optical axis z of the incident white light L and a central normal on the ophthalmic lens 6 coincide, and by rotating the lens support together with the ophthalmic lens 6 arranged thereon about a rotational axis coinciding with the central normal on the ophthalmic lens 6 up to 360°. The ophthalmic lens 6 may be held on the support e.g. by suction force. The support on which the ophthalmic lens 6 rests may be arranged within a container holding the fluid in which the ophthalmic lens 6 is immersed. Irradiation of the segment on the surface 7 of the ophthalmic lens 6 may be accomplished e.g. through a water dip objective (not shown).

Reflected light R is passed through the wavelength dispersive optical element 5 and transported to the beam splitter 4 which deflects the reflected light R through a second pin hole 8 towards a spectrometer 9 with attached evaluation unit. The wavelength dispersive optical element focuses the reflected light onto the second pin hole 8. The second pin hole 8 corresponds to the first pin hole 3 and serves to eliminate light which does not come from the surface 7 of the ophthalmic lens 6. With the aid of the spectrometer 9 behind the second pin hole 8 the reflected light R is analyzed and a dominant wavelength $\lambda_d$ of the reflected light R may be determined. The results of the analysis of the reflected light R in the spectrometer 9 are stored in the attached evaluation unit and may be displayed e.g. on a screen 10. In FIG. 1 a display 11 is indicated which shows a diagram of a measured signal intensity I of a detector within the spectrometer 9 versus the wavelength $\lambda$ of the reflected light R. The measured signal intensity I has its maximum at the dominant wavelength $\lambda_d$.

The described optical setup comprising a source 1 of white light, first and second pin holes 3, 8, a beam splitter 4, a wavelength dispersive optical device 5, and a spectrometer 9 with attached evaluation unit is the setup of a chromatic sensor system, which is well known in the art.

For a measurement of reflectivity values p the intensity of the incident white light L is modulated. For that purpose in the depicted setup there is arranged in the light path of the white light source 1 a series of grey scale filters, which are preferably arranged on a filter wheel 11. By rotation of the filter wheel 11, which is indicated by the arrow D, different gray scale filters may be selected. In FIG. 1 e.g. the different gray scale filters on the filter wheel 11 are designated with $I_0, I_1, I_2, I_3$, and $I_4$ and correspond to different intensities $I_0, I_1, I_2, I_3$, and $I_4$ of the incident beam of white light L. $I_0$ designates the maximum intensity of the incident white light L, while $I_4$ designates the weakest intensity. $I_1, I_2, I_3$, respectively, designate intensities of the incident white light L which lay in between the two extremes, the intensities growing weaker with rising index number.

Figure 2:
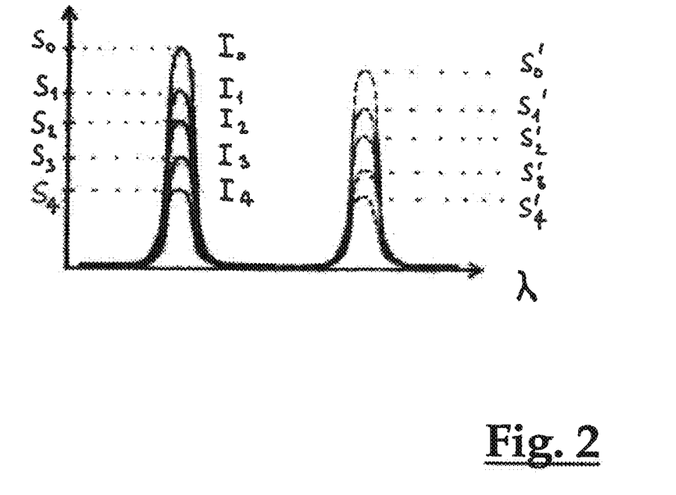
FIG. 2 shows a diagram of varying signal strengths over wavelengths as obtained by modulation of the intensity of incident white light e.g. by a grey scale filter wheel.

The different intensities of the $I_0, I_1, I_2, I_3$, and $I_4$ of the incident white light result in different intensities of the reflected light R, and thus, in correspondingly varying strengths of the signal which is produced by the detector of the spectrometer. In FIG. 2 an exemplary diagram showing the measured signal strengths $S_0, S_1, S_2, S_3$, and $S_4$ for corresponding intensities $I_0, I_1, I_2, I_3$, and $I_4$ of the incident white light L at the determined dominant wavelength $\lambda_d$ of the reflected light R is depicted. The diagram shows that the signal strengths $S_0, S_1, S_2, S_3$, and $S_4$ decrease with decreasing intensities $I_0, I_1, I_2, I_3$, and $I_4$ of the incident white light L at the determined dominant wavelength $\lambda_d$. In FIG. 2 also a second set of peaks of signal strengths $S_0', S_1', S_2', S_3'$, and $S_4'$ at a greater wavelength is shown. This second set of peaks of signal strengths may e.g. result from light reflected from a region below the surface 7 of the ophthalmic lens, such as, e.g. from a second transition surface of the ophthalmic lens 6 to the surrounding fluid having a comparable reflectivity. Knowledge of this second set of peaks of signal strengths $S_0', S_1', S_2', S_3'$, and $S_4'$ in combination with the measured first set of signal strengths $S_0, S_1, S_2, S_3$, and $S_4$ may e.g. be used to determine the vertical thickness of the ophthalmic lens at a specific segment on the surface 7 of the ophthalmic lens 6.

In FIG. 1 by way of example a gray scale filter wheel 11 has been shown as a tool for modulating the intensity of the incident white light L. While the depicted filter wheel 11, by way of example only, is shown having five gray scale filters of varying transmission, it should be noted that filter wheels with less and, more preferably, with a greater number of grey scale filters may also be used. It should further be noted that in alternative methods also optoelectronic devices in the optical path of the incident white light may be used for modulating the intensity of the incident white light L. Finally even a method of simulation of varying intensity of the incident white light may be employed by varying an amplification of the signal of the detector of the spectrometer 9, such as, e.g., by varying a sampling time of the detector.

Figure 3:
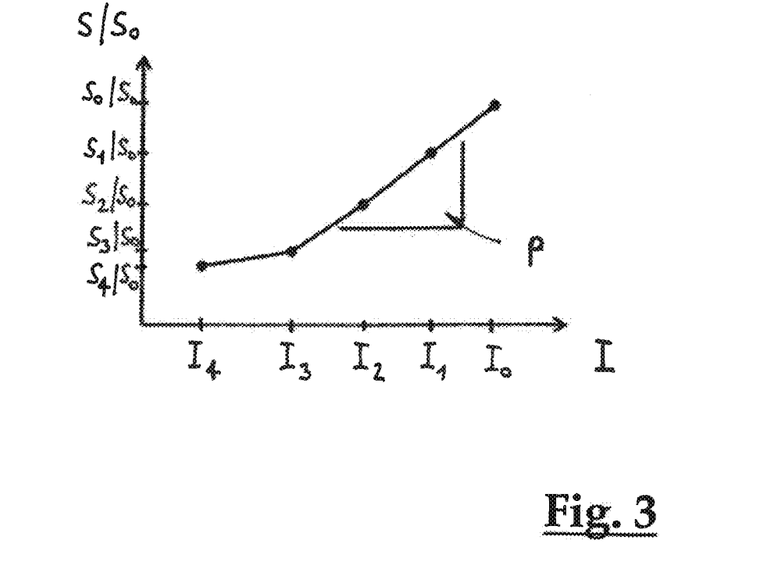
FIG. 3 shows a diagram of relative signal strength over intensity of the incident white light for determination of a reflectivity value.

FIG. 3 shows schematically how a reflectivity value X for a segment on the surface 7 of an ophthalmic lens 6, which corresponding to the modulation is irradiated with varying intensities $I_0$, $I_2$, $I_3$, and $I_4$ of incident white light L is determined. For that purpose relative signal strengths $S_0/S_0$, $S_1/S_0$, $S_2/S_0$, $S_3/S_0$, and $S_4/S_0$ are determined by dividing the measured signal strengths $S_0$, $S_1$, $S_2$, $S_3$, and $S_4$ by the maximum measured signal strength $S_0$ at the maximum intensity $I_0$ of the incident white light L. The relative signal strengths $S_0/S_0$, $S_1/S_0$, $S_2/S_0$, $S_3/S_0$, and $S_4/S_0$ are correlated with the varying intensities $I_1$, $I_2$, $I_3$, and $I_4$ of the incident white light L. The reflectivity value p of the irradiated segment on the surface 7 of the ophthalmic lens then is obtained from the derivative, or the slope, of the graph representing the relative signal strengths $S_0/S_0$, $S_1/S_0$, $S_2/S_0$, $S_3/S_0$, and $S_4/S_0$ in dependency from the varying intensities $I_1$, $I_2$, $I_3$, and $I_4$ of the incident white light L. In order to avoid false results the derivative or slope is taken from the linear portion of the graph.

The measurement of the reflectivity value p of an irradiated segment on the surface 7 of the ophthalmic lens is accomplished without any axial movement of the ophthalmic lens 6 relative to the optical devices, namely the beam splitter 4 and the wavelength dispersive element 5. Thus, when the support is tilted or rotated in order to irradiate a different segment on the surface 7 of the ophthalmic lens 6, there is no need for a re-alignment of the optical setup. The determined dominant wavelength $\lambda_d$ corresponds to the transition from the surrounding fluid to the surface 7 of the ophthalmic lens 6. By having the ophthalmic lens 6 immersed in fluid, more specifically in water or lacrimal fluid or a tear-like fluid or mixtures thereof, the sensitivity of the measurement setup is increased. Small changes in the amount of water contained in the evaluated surface lead to already considerable differences in the refractive index of the surrounding fluid and of the tested surface 7 of the ophthalmic lens 6, which may, e.g. be coated with a coating of high water content.

The refractive index of the coating of an ophthalmic lens depends on the amount of water absorbed in the coating. The refractive index of the coating of the coated surface 7 of the coated ophthalmic lens 6 surface corresponds to the sum of the concentration of fluid in the coating multiplied with the refractive index of the fluid and the concentration of the coating matrix in the coating multiplied with the refractive index of the coating matrix. Depending on the difference between the refractive index of the surrounding fluid and the refractive index of the coating of the coated surface 7, a stronger or weaker value of the reflectivity will be measured. The more water is absorbed in the coating, the more the refractive index of the surrounding fluid will resemble the refractive index of the coating of the coated surface 7 of the ophthalmic lens 6 and, consequently, the smaller the measured value of the reflectivity p will be.

In order to be able to measure the reflectivity values p of different segments of the (coated) surface 7 of the ophthalmic lens 6, the lens support may be rotated about its axis, a, which in a starting position coincides with the optical axis z, and which may be tilted from a starting position to an angle of up to 60°. The starting position may be defined as the position of the lens support in which the optical axis z coincides with a central normal on the lens surface 7. The central normal runs through the center of the (coated) ophthalmic lens and normal to the plane which is tangential to the coated ophthalmic lens 6 at the lens center. For a quick test a measurement in a central segment of the lens surface 7 including the center of the ophthalmic lens 6, may be sufficient. For example, such a one-segment inspection may be sufficient for a determination of the efficacy of a coating process, by verifying that a coating is present. In order to obtain a better characterization of the ophthalmic lens 6 the reflectivity values p of a central segment and of a number of segments in a peripheral region of the front surface or back surface of the ophthalmic lens, which may be a coated ophthalmic lens, may be measured. The peripheral region of the surface 7 of the ophthalmic lens 6 may be selected such that it has an angular distance from the central segment of up to 60°, preferably of up to 40°.

Measurements in the selected peripheral regions in particular cover the optical zone of the ophthalmic lens 6. By measuring values of the reflectivity ρ of the front surface 7 (or the coated back surface, respectively) also in peripheral regions of a coated ophthalmic lens 6, it may be ensured that the coating is homogeneous over the entire ophthalmic lens 6 and that the coating polymer possesses a targeted compactness. Also, with an increasing number of inspected segments of the coated surface 7, a more detailed characterization of the coated ophthalmic lens 6 may be achieved. Such multi-segment measurements may be useful e.g. for a determination of the resistance to mechanical stress of the coating, or for longtime endurance and ageing evaluations of coated ophthalmic lenses. If deemed necessary the coated ophthalmic lens 6 may also be scanned over the entire coated surface 7, which may be a coated front surface or a coated back surface of a coated ophthalmic lens 6.

A multi-segment measurement or a full-scan measurement of reflectivity values p may also be used to compute a topography of the respective surface. The computed topography may then optionally be displayed graphically or visually, e.g. on a screen. Such procedure may prove advantageous e.g. in the topographical characterization of aspheric or toric lenses with or without prism ballasting.

The measured reflectivity values p may be compared with the reference reflectivity values of a front surface or a back surface, which may be coated, of a coated reference ophthalmic lens with known material properties electronically. Thus, a qualitative characterization of an inspected coated ophthalmic lens 6 may be obtained very easily.

From the measured reflectivity values even a water content of the ophthalmic lens 6 at the lens surface 7, which may be coated, may be quantified. A quantitative determination of the water content may be based on the fact that the measured reflectivity is also proportional to the square of the difference between the refractive index of the surrounding fluid and the refractive index of the fluid-containing coating. In this quantitative determination the refractive index of the fluid-containing coating is defined as the sum of the concentration of fluid in the polymeric coating multiplied with the refractive index of the fluid and the concentration of the coating matrix in the polymeric coating multiplied with the refractive index of the coating matrix.

As has been mentioned before, the method according to the invention may be used to determine e.g. an optimum coating material and optimum coating parameters for a given substrate material of an ophthalmic lens. Such optimum coating parameters include but are not limited to coating time, temperature of a coating bath, concentration of a coating bath, etc. In yet a further application, the method according to the invention may even be used qualitatively and quantitatively determine absorption rates of a fluid within the coating.

Although the invention has been described with reference to a specific optical setup using a chromatic sensor system, it is evident to the person skilled in the art that this embodiment has been described only by way of example, and that various changes and modifications are conceivable without departing from the teaching underlying the invention. While the invention has been described with particular focus on the testing of coated ophthalmic lenses, it must be noted that the testing method may as well be carried out with non-coated ophthalmic lenses in order to determine characteristic properties of lens materials or optimum parameters e.g. of a plasma treatment of the ophthalmic lenses. Therefore, the invention is not intended to be limited by the embodiment described but rather is defined by the appended claims.

The invention claimed is:

1. Method for characterizing an ophthalmic lens, having a front surface and a back surface, which method comprises the steps of:
immersing the ophthalmic lens in a fluid selected from the group consisting of water, lacrimal fluid, tear-like fluid, and mixtures thereof, and
with the aid of a chromatic sensor system:
determining a transition from the fluid to the front surface or to the back surface of the ophthalmic lens to identify the location of the front surface or back surface of the ophthalmic lens,
by illuminating at least one segment of the front surface or the back surface of the ophthalmic lens with incident white light;
directing light reflected from the at least one segment of the front surface or of the back surface of the ophthalmic lens to a spectrometer;
determining a dominant wavelength of the reflected light, which corresponds to the transition from the fluid to the at least one segment of the front surface or the back surface of the ophthalmic lens;
at the determined dominant wavelength of the reflected light measuring a reflectivity value of the least one segment of the front surface or the back surface of the ophthalmic lens;
optionally repeating the afore-mentioned procedure for further segments on the front surface or the back surface of the ophthalmic lens for measuring reflectivity values of the further segments;
storing each measured reflectivity value,
comparing each stored measured reflectivity value with a corresponding reference reflectivity value, in particular with a corresponding reference reflectivity value of a front surface or a back surface of a reference ophthalmic lens having known material properties, and
from a difference between the respective stored measured reflectivity value of the ophthalmic lens and the corresponding reference reflectivity value determining the quality of the inspected surface of the ophthalmic lens.

2. Method according to claim 1, wherein at least the reflectivity value of a central segment of the front surface or the back surface of the ophthalmic lens is measured.

3. Method according to claim 2, wherein the reflectivity value of the central segment and reflectivity values of a number of peripheral segments of a peripheral region of the front surface or the back surface of the ophthalmic lens are measured, wherein the peripheral region of the front surface or the back surface extends from the central segment an angular distance of up to 60°, preferably up to 40°, as measured from a central normal on the ophthalmic lens.

4. Method according to claim 1, wherein the reflectivity values are measured in a plurality of segments arranged over the entire front surface or back surface of the ophthalmic lens.

5. Method according to claim 1, further comprising the step of arranging the ophthalmic lens on a lens support, wherein the reflectivity values are measured in a plurality of segments of the front surface or of the back surface by tilting the lens support together with the ophthalmic lens arranged thereon by an angle of up to 60° relative to a starting position, in which an optical axis of the incident white light and a central normal on the ophthalmic lens coincide, and by rotating the lens support together with the ophthalmic lens arranged thereon about a rotational axis coinciding with the central normal on the ophthalmic lens up to 360°.

6. Method according to claim 5, wherein at least during the determination of the reflectivity values the ophthalmic lens is retained on the lens support by suction force.

7. Method according to claim 1, wherein for the measurement of the reflectivity value of the at least one segment of the back surface of the ophthalmic lens the ophthalmic lens is inverted.

8. Method according to claim 1, wherein the step of determining the reflectivity value of each segment on the front surface or the back surface of the ophthalmic lens comprises
modulating the intensity of the incident light to obtain a number of well-defined incident light intensities distinct from one another,
at the determined dominant wavelength of the reflected light measuring a relative signal strength of a detector of the spectrometer for each well-defined incident light intensity, and
from a derivative of the relative signal strength over the corresponding incident light intensities determining the reflectivity.

9. Method according to claim 8, wherein modulation of the incident white light is accomplished by one of the methods selected from the group consisting of variation of an irradiation intensity of a white light source, placing a series of grey scale filters, preferably arranged on a filter wheel, in the optical path of the incident white light, use of optoelectronic devices in the optical path of the incident white light, and varying an amplification of the signal of the detector of the spectrometer, comprising varying a sampling time of the detector.

10. Method according to claim 1, wherein the incident white light is directed onto at least one segment of the front surface or the back surface of the ophthalmic lens after having been passed through a wavelength dispersive optical element selected from the group consisting of wavelength dispersive lenses, diffraction gratings, comprising Fresnel diffraction gratings, and holographic optical elements.

11. Method according to claim 1, wherein from the difference between the respective stored measured reflectivity value and the corresponding reference reflectivity value a water content of the ophthalmic lens at the front surface or the back surface of the ophthalmic lens is quantified.

12. Method according to claim 1, wherein the measurement of the reflectivity value is carried out on a coated front surface or on a coated back surface of a coated ophthalmic lens.

13. Method according to claim 11, wherein from the difference between the respective stored measured reflectivity value and the corresponding reference reflectivity value an optimum coating material for a respective substrate material is determined.

14. Method according to claim 13, wherein from the difference between the respective stored measured reflectivity value and the corresponding reference reflectivity value optimum coating parameters are determined.

15. Method according to claim 1, wherein from the difference between the respective stored measured reflectivity value and the corresponding reference reflectivity value an amount of absorption of fluid in the inspected surface of the ophthalmic lens is determined qualitatively or quantitatively.

16. Method according to claim 1, wherein in addition to a determination of a dominant wavelength of the reflected light of at least one segment on the front surface or the back surface of the ophthalmic lens a second dominant wavelength of reflected light from a corresponding second segment on the back surface or front surface of the ophthalmic lens, respectively, may be detected, the first segment and second the second segment and the source of incident white light being coaxial, and from measured reflectivity values at the two detected dominant wavelengths a vertical thickness of the ophthalmic lens at the at least one segment may be determined.

17. Method according to claim 1, wherein from a plurality of reflectivity measurements on the front surface or the back surface of the ophthalmic lens a topography of the respective surface may be computed and may optionally be displayed graphically or visually.

18. Method according to claim 1, wherein measurement of the reflectivity value is carried out on a coated front surface or on a coated back surface of a contact lens, in particular a soft contact lens.

\* \* \* \* \*